United States Patent [19]

Sharma

[11] Patent Number: 5,665,220
[45] Date of Patent: Sep. 9, 1997

[54] ELECTROLYTIC MAGNESIUM PRODUCTION PROCESS

[75] Inventor: Ram Autar Sharma, Troy, Mich.

[73] Assignee: General Motors Corporation, Detroit, Mich.

[21] Appl. No.: 579,057

[22] Filed: Dec. 26, 1995

[51] Int. Cl.$^6$ .................................. C25C 3/06; C25C 3/00
[52] U.S. Cl. ........................... 205/359; 205/372; 205/404; 205/407; 205/411; 423/497; 423/499.3; 423/DIG. 12
[58] Field of Search .................................. 423/497, 499.3, 423/DIG. 12; 205/359, 362, 392, 407–409, 411, 393, 687, 372

[56] References Cited

U.S. PATENT DOCUMENTS

| | | | |
|---|---|---|---|
| 2,900,319 | 8/1959 | Ferrand | 204/246 X |
| 3,344,049 | 9/1967 | Thieler | 205/407 |
| 4,073,703 | 2/1978 | Kinosz et al. | 204/70 |
| 4,083,943 | 4/1978 | Kinosz et al. | 423/498 |
| 4,085,198 | 4/1978 | Emeta | 423/498 |
| 4,248,839 | 2/1981 | Toomey et al. | 423/178 |
| 4,988,417 | 1/1991 | DeYoung | 205/407 |
| 5,089,094 | 2/1992 | Ogasawara et al. | 423/497 X |

FOREIGN PATENT DOCUMENTS

WO95/31401  11/1995  WIPO.

OTHER PUBLICATIONS

Kirk–Othmer, "Encyclopedia of Chemical Technology," 3rd Edition, vol. 2, pp. 144–154.
Kirk–Othmer, "Encyclopedia of Chemical Technology," 3rd Edition, vol. 14, pp. 576–583.

*Primary Examiner*—Donald R. Valentine
*Attorney, Agent, or Firm*—George A. Grove

[57] ABSTRACT

In the electrolytic production of magnesium from an electrolyte comprising magnesium chloride and impurity quantities of magnesium oxide which adversely affects the efficiency of cell operation, the magnesium oxide is chemically and electrolytically removed from the electrolyte by sparging the electrolyte with hydrogen and/or hydrocarbon gas adjacent the anode such that MgO reacts with $H_2$ or, e.g., $CH_4$ and $Cl_2$ (generated at the anode) under the electrical potential of the cell to form magnesium chloride. Similarly, magnesium oxide may be mixed and stirred in molten magnesium chloride and reacted with $Cl_2$ and $H_2$ (and/or hydrocarbon) to form anhydrous $MgCl_2$ for use in magnesium production.

14 Claims, 1 Drawing Sheet

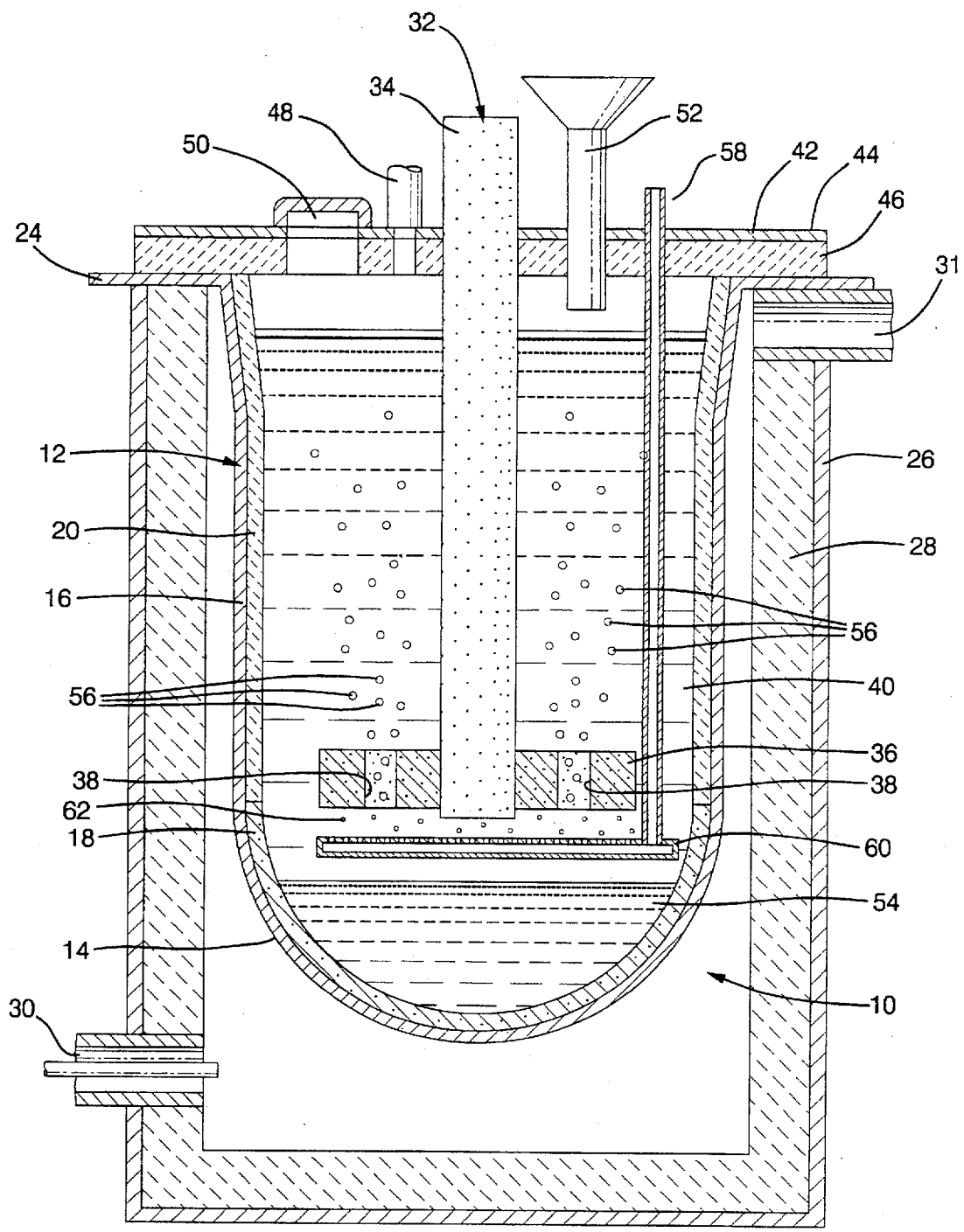

ELECTROLYTIC MAGNESIUM PRODUCTION PROCESS

This invention pertains to the electrolytic production of magnesium. In one aspect, it relates to the electrolytic production of magnesium from a molten electrolyte containing magnesium chloride and magnesium oxide impurity. It also relates to the production of anhydrous magnesium chloride from magnesium oxide or partially dehydrated magnesium chloride.

BACKGROUND OF THE INVENTION

Magnesium-containing alloys are finding an increasing number of applications, especially where lightweight structural members are required. The need for lightweight structural materials is particularly acute in the automotive industry where fuel savings, reduced exhaust emissions and other advantages are obtained from reduced vehicle mass. While the need for the use of lighter materials of construction in the automotive industry has long been apparent, the relatively high cost of magnesium and its alloys has been a deterrent to their usage.

Most of the world's supply of magnesium metal is obtained by the electrolytic dissociation of magnesium chloride to magnesium and chlorine. The magnesium chloride is a component of a homogeneous molten electrolyte that also comprises one or more alkali metal chloride salts and/or alkaline earth metal chloride salts. Examples of such additional salt ingredients of the magnesium chloride electrolyte are sodium chloride, potassium chloride, lithium chloride, calcium chloride and barium chloride. Sometimes a small amount of a fluoride salt such as calcium fluoride or magnesium fluoride is also included in the electrolyte composition. A magnesium-producing cell also includes one or more anodes which are typically made of a suitable form of carbon such as graphite. The cathode may be made of steel or may consist of a molten metal layer in contact with the electrolyte. When a direct electrical current is passed through the magnesium chloride-containing electrolyte in such a cell, chlorine is evolved at the anode and magnesium metal collected at the cathode. The magnesium chloride thus consumed is replaced by a suitable feedstock of magnesium chloride, and the cell is operated on a continuous basis until the accumulation of impurities or other event requires that it be shut down.

A significant element of the cost of the electrolytic production of magnesium is the preparation of the magnesium chloride for addition to the electrolyte bath as the original magnesium chloride content is decomposed into magnesium and chlorine. The magnesium chloride must be provided in a form suitable for use in the above-described electrolytic bath. However, pure, dry magnesium chloride is not easy to obtain.

Magnesium is the world's most readily available metal. The ocean is an enormous reservoir of magnesium, and there are abundant salt deposits and other mineral deposits of magnesium. Sea water, salt lake water and brine waters contain magnesium chloride ($MgCl_2$). Mineral deposits include magnesite-magnesium carbonate ($MgCO_3$). dolomite, a mixture of magnesium carbonate and calcium carbonate ($CaCO_3.MgCO_3$), carnallite, a combination of magnesium chloride and potassium chloride ($KCl.MgCl_2 \cdot 6H_2O$) and brucite, a magnesium hydroxide ($Mg(OH)_2$).

The design or specification of a process for the production of magnesium metal is affected in large measure by the selection of a feedstock material and its adaptation to a form of magnesium chloride for addition to the electrolyte bath. While magnesium oxide may be cheaper to obtain from mineral deposits than magnesium chloride from seawater or brine, magnesium oxide has been difficult to use because of the absence of a suitable electrolyte solvent for the homogeneous electrolytic decomposition of the magnesium oxide. At the present time, most commercial processes except for the Dow process use anhydrous magnesium chloride. Textbooks describe the Dow process as using a partially dehydrated magnesium chloride that is nominally about 73 percent by weight magnesium chloride. The various separation and purification processes in use for obtaining $MgCl_2$ including the Dow process are described, for example, in the *Encyclopedia of Chemical Technology*, Kirk-Othmer, 3rd Edition, Volume 14, at pages 576–583.

In each of the feedstocks, it is difficult to prevent the buildup of magnesium oxide in the electrolytic magnesium production cell. Magnesium oxide is either added as an impurity with the magnesium chloride, it is formed when the partially dehydrated magnesium chloride is melted and added to the bath, or it is generated by oxidation of $MgCl_2$ in the bath itself. In any case, the efficiency or duration of the operation of a magnesium cell is reduced by the presence or formation of magnesium oxide as a separate, sludge-forming contamination in the magnesium chloride-containing electrolyte.

The efficiency of all current magnesium production processes could be improved by the utilization of a practice that converts magnesium oxide to magnesium chloride in the magnesium production cell or for use in the cell.

SUMMARY OF THE INVENTION

The invention may be practiced in a chemical embodiment or in an electrochemical-chemical embodiment. The chemical embodiment involves preparation of anhydrous magnesium chloride using a suitable quantity of magnesium oxide or partially dehydrated magnesium chloride suspended in molten magnesium chloride. In this embodiment, one prepares a liquid/solid mixture of a minor portion of magnesium oxide (e.g., <25% by weight of the mixture) and a major portion of magnesium chloride. The mixture consists of solid particles of MgO dispersed in liquid $MgCl_2$. Preferably, the mixture is stirred to thoroughly disperse the MgO particles for reaction with a gas. Substantially equimolar amounts of chlorine gas and hydrogen and/or hydrocarbon gas are separately but concurrently bubbled through the stirred mixture. The hydrocarbon if used is preferably a low molecular weight hydrocarbon such as natural gas or methane. (A subsequent reference to hydrogen hereinbelow is also intended to include the optional use of a suitable hydrocarbon gas in place of or mixed with hydrogen.) The temperature of the molten mixture will typically be of the order of 725° C. to 800° C. The presence of the hydrogen and chlorine in the two-phase magnesium oxide-magnesium chloride mixture effects the conversion of magnesium oxide to magnesium chloride with the release of water in the form of steam or gas (and $CO_2$ if hydrocarbon gas is used). At the conclusion of the reaction, only the anhydrous magnesium chloride phase remains and, of course, its volume is increased by the conversion of MgO. It is to be noted that the two gases, hydrogen and chlorine, are added separately but concurrently in amounts suitable for the conversion of the magnesium oxide to magnesium chloride and water (and possibly $CO_2$ if hydrocarbon gas is used).

This process embodiment is effective only where the reaction between $H_2$ and $Cl_2$ to form hydrogen chloride (HCl) is avoided or eliminated. Since the reaction medium and reactants involve three phases—solid MgO, liquid MgCl$_2$ and gas Cl$_2$ and H$_2$—there may be particular reactor designs or reaction medium environments in which HCl formation tends to occur. However, this situation can be suitably avoided or reversed by imposing a direct current potential greater than that of HCl decomposition potential across the reactor media of the MgO/MgCl$_2$ melt.

In the second embodiment of the invention, a chemical/electrolytic reaction practice is followed in the electrolytic production of magnesium itself. In this embodiment, the molten electrolyte is employed which contains magnesium chloride and other chloride and possibly fluoride salts. In the electrolytic cell, chlorine gas is evolved at the anode and magnesium metal generated at a cathode in the electrolysis. In this practice, care is taken to prevent the chlorine gas emitted at the anode from coming into contact with the molten magnesium with which it would react. However, in this embodiment, the evolution of chlorine is utilized by the supplemental addition of a suitable quantity of hydrogen gas (and/or hydrocarbon as described above) in the vicinity of the anode to react with and reduce any magnesium oxide that may be entrained in or otherwise present as a distinct phase in the magnesium chloride electrolyte. In this embodiment, the chlorine is being produced along with the production of magnesium metal. The amount of hydrogen that is added to the electrolyte in the vicinity of the anode is only that amount which is required to react with the magnesium oxide that is contaminating the electrolyte.

Thus, it is seen that an advantage of the invention is that magnesium oxide may be treated in combination with magnesium chloride or a magnesium chloride-containing electrolyte so as to efficiently react with hydrogen and chlorine to convert the magnesium oxide to useful anhydrous magnesium chloride and an environmentally benign water. In a magnesium production cell, the reaction is induced by the passage of an electrical current through the electrolyte. In the MgO/MgCl$_2$ chemical reactor, the electrical potential is employed only as necessary to inhibit HCl formation. The practice of the invention in connection with the operation of a magnesium production cell is found to greatly improve the cleanliness, long-term operability and efficiency of the cell by removing magnesium oxide or magnesium oxide-containing sludge from the bath.

While the invention has been described in terms of a brief summary, other objects and advantages of the invention will become more apparent from a detailed description thereof which follows.

BRIEF DESCRIPTION OF THE DRAWINGS

The drawing FIGURE is a schematic diagram in cross section of an electrolytic magnesium production cell comprising a graphite anode, an electrolyte, a molten magnesium alloy cathode and means for introducing hydrogen in accordance with the invention in the region of the anode.

DESCRIPTION OF PREFERRED EMBODIMENTS

The practice of the subject invention involves the reaction of magnesium oxide, hydrogen and chlorine in accordance with the following reactions:

(1)

and/or

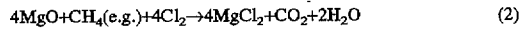

(2)

In a magnesium production cell, this reaction(s) takes place in the medium of a molten magnesium chloride-containing molten salt electrolyte mixture at a temperature in the region of 1000K and under the influence of an electrical potential. In an MgO/MgCl$_2$ chemical reactor to prepare pure anhydrous magnesium chloride free from magnesium oxide, this reaction scheme can be used only if conditions promoting the formation of hydrogen chloride by reaction between hydrogen and chlorine gases can be eliminated. Where reactor design or conditions do not eliminate HCl formation, this is accomplished by imposing an electrical potential greater than the propensity for hydrogen chloride to form (e.g., about 1 volt) across the MgO particle-containing melt into which hydrogen and chlorine will be sparged.

A thermochemical analysis of these reactants and reaction products at 1000K shows that the standard free energy change of the reaction (1) is indeed negative (about −43 kcal at 1000K), and therefore this reaction is spontaneous at this temperature. This may appear strange because while it might be viewed as more desirable to react magnesium oxide with a single gas such as chlorine or hydrogen chloride, such reactions are not particularly thermodynamically favored at the temperatures of the electrolytic baths for the production of magnesium. It also turns out that not only does the co-sparging of magnesium oxide with hydrogen and chlorine convert this component of the bath to magnesium chloride, the decomposition potential of magnesium chloride itself in the presence of hydrogen is lower than in the absence of hydrogen. Thus, this invention utilizing the combined presence of hydrogen and chlorine in a suitable molten salt electrolyte for the production of magnesium facilitates both the production of magnesium and the elimination of the undesirable magnesium oxide.

Operation of Magnesium Production Cell

The practice of the subject electrolytic magnesium production method embodiment will be better understood in view of a description of apparatus suitable for the practice of the method.

The FIGURE is a sectional view of an electrolytic cell 10. The cell comprises a cast steel pot 12 with a hemispherical base portion 14 and a cylindrical upper portion 16. The base portion is provided with a carbon lining 18, and the upper cylindrical portion is provided with a refractory lining 20. The carbon lining (not needed in the case of pure magnesium production) is adapted to contain a molten magnesium-aluminum alloy or other suitable magnesium alloy 54 which serves in this example both as the cathode and a below-the-electrolyte repository for the newly-produced magnesium metal. The upper lip of the cylindrical portion of the pot serves as a cathode lead 24. Steel pot 12 is supported on and contained within an outer steel shell 26. Steel shell 26 has a suitable can-like shape and is provided with an internal refractory lining 28 to serve as a heating furnace for cast steel pot 12. In order to facilitate the heating of cast steel pot 12 and its contents, a coaxial opening 30 for gas and air is provided at the lower portion of shell 26 and a gas exhaust 31 is provided at the upper end of steel shell can 26. Of course, electrical heating could be employed in place of gas heat.

The heating unit of this apparatus is adapted to heat the electrolytic cell pot 12 and its contents to a controllable temperature in the range of 700° C. to 850° C. over prolonged periods of time.

A graphite anode 32 comprising a long cylindrical shaft 34 with a flat pancake-shaped base 36 with perforations 38 is adapted to be inserted into a molten electrolyte 40. The composite anode 32 is carried in a top closure member 42 which comprises a steel plate 44 and is protected on the inside surface with a refractory lining 46. A packing gland (not shown) serves to enclose the anode shaft 34 to prevent egress of materials from the pot other than as desired. Also included in the top 42 is a gas vent 48 to permit exit of chlorine gas or water as will be described. Also included in top 42 is a port 50 (shown closed) through which magnesium or magnesium-aluminum alloy may be siphoned from time to time as necessary and desired. There is also included in the top 42 a feedstock opening 52 to introduce anhydrous magnesium chloride or partially dehydrated magnesium chloride or magnesium chloride containing magnesium oxide. Top 42 also carries a ceramic gas addition tube 58 with a sparger plate 60 at its lower end adapted to be immersed in electrolyte 40 and to introduce hydrogen and/or hydrocarbon gas as bubbles 62 at the anode base 36 into the electrolytic cell. Preferably, the cell 10 is relatively narrow in cross section and deep, as depicted, to provide suitable contact space for the $Cl_2/H_2$ gases to react with MgO.

In this illustrated operation of the electrolytic cell 10, solid metal alloy capable of forming a magnesium-aluminum alloy, for example, is added to the pot and heated until it is molten. The molten cathode is shown at 54 in FIG. 1. A suitable magnesium alloy in this embodiment is one that initially comprises about 50 to 90 percent by weight magnesium and the balance aluminum. This magnesium alloy is formulated to serve at least two purposes. First, the alloy is to be of higher density than the potassium chloride-magnesium chloride electrolyte. Pure magnesium has about the same density as 80% KCl-20% $MgCl_2$ mixtures at cell operating temperature. However, magnesium-aluminum alloys containing more than about ten percent by weight aluminum fulfill the higher density requirement. Second, the goal in this embodiment is to produce an alloy useful "as is". Thus, the magnesium alloy may contain other heavier alloying constituents such as zinc and copper. Magnesium may also be alloyed with copper or zinc (instead of aluminum) to serve as the under-the-electrolyte cathode.

The electrolyte 40 in this example is a salt mixture consisting essentially of about three to five parts by weight of LiCl plus KCl per part of $MgCl_2$. These mixtures provide the desired electrolyte density and reactivity between chlorine, hydrogen (and/or hydrocarbon) and magnesium oxide. Other constituents such as sodium chloride may be added to adjust melting point, melt fluidity, conductivity and the like. The electrolyte 40, which, for example, initially consists of, for example, 50 percent by weight potassium chloride, 25 percent by weight lithium chloride, 24 percent by weight anhydrous magnesium chloride and one percent $MgF_2$, is added to the pot and heated until it is molten. Other suitable electrolyte mixtures include, for example, by weight, 5 to 25 percent $MgCl_2$, 0 to 20 percent NaCl, 0 to 30 percent LiCl and 30 to 60 percent KCl. A small mount, e.g., about one percent by weight, of calcium fluoride or magnesium fluoride may be added to the salt mixture since it appears to promote cleanliness of the electrolyte in cell operation. At this point, the anode 32 and hydrogen sparging tube 58 are immersed in the molten electrolyte 40 and the top is closed and the system is ready for operation.

A suitable direct current potential, for example, about 4 to 7 volts, is applied between the cathode lead 24 and the graphite anode 34. The anode is maintained at a positive potential with respect to the cathode. A preferred operating temperature for the system is about 750° C. At this temperature, the cathode is more dense than the molten salt electrolyte, and the molten electrolyte can provide the medium for reactions between chlorine and hydrogen gas and magnesium oxide (solid) to convert MgO to magnesium chloride. Upon application of the direct current potential, electrolysis of the magnesium chloride occurs, whereupon magnesium cations are reduced at the interface of the molten salt electrolyte 40 and the molten cathode 54, and magnesium metal is absorbed into the molten cathode. Concomitantly, chloride anions are oxidized at the anode base 36 and perforations 38 and chlorine gas is emitted which bubbles 56 upwardly through the electrolyte 40 toward the gas vent 48.

As stated above, a difficulty with magnesium production is that magnesium oxide becomes present in the cell. For example, it may be added with the $MgCl_2$ feedstock as an impurity. It may be formed in the cell if the feedstock is partially dehydrated $MgCl_2$ because the water reacts with $MgCl_2$ to form MgO. It may form due to the presence of water or oxygen in the cell. The magnesium oxide is solid and practically insoluble in the above-exemplified electrolytes or others commonly used in magnesium production (except—see U.S. Pat. No. 5,279,716, "Method for Producing Magnesium Metal from Magnesium Oxide," Ram A. Sharma). The magnesium oxide exists as a separate, unwanted phase mixed with the electrolyte and/or at the interface of the electrolyte and the magnesium phase. Its presence in such form reduces cell current efficiency, impedes separation of metal and salt phases, and otherwise contaminates the cell.

The elimination of magnesium oxide impurity by reaction with chlorine gas and hydrogen gas in the electrolyte 40 is a unique aspect of this invention. The selective reaction between magnesium oxide, hydrogen and chlorine under a potential applied for magnesium production from the electrolyte at the normal operating temperatures of the cell also converts MgO to magnesium chloride and water. Furthermore, by producing the magnesium metal at the bottom of the molten electrolyte layer 40, the chlorine gas does not react with the magnesium to reform magnesium chloride from the metal product. Magnesium chloride that is formed in the electrolyte layer from the in situ reacted magnesium oxide contaminant is, of course, an essential ingredient of the electrolyte. In the event that a partially hydrated magnesium chloride ($MgCl_2 \cdot x\ H_2O$, where $0 \leq x \leq$ about 3) is employed as a part of the feedstock charge, it is dehydrated by the hot molten electrolyte and the presence of the chlorine gas and hydrogen either prevents MgO sludge formation or converts the MgO to $MgCl_2$. Vaporous water is carried out of the cell with the gases that are otherwise emitted from the electrolyte.

As the magnesium thus accumulates in the molten magnesium-aluminum alloy, some of the magnesium-aluminum alloy is removed at suitable intervals. Additional aluminum and/or other suitable alloying constituents are added to boot layer 54 to maintain the cathode composition. Magnesium chloride, which may be only partially dehydrated or may contain magnesium oxide as a tolerated impurity, is added onto the electrolyte layer 40 into which the $MgCl_2$ is assimilated. In this way, magnesium metal can be more or less continuously produced and magnesium-aluminum alloy periodically removed by siphoning or other suitable means from the bottom of the operating cell 10.

While chlorine is evolved as long as magnesium chloride is being electrolytically decomposed, hydrogen (and/or hydrocarbon) need only be added to the cell in an amount necessary to react with the magnesium oxide actually present in the cell. If the feedstock contains a known quantity of magnesium oxide (e.g., 1% to 2% by weight), hydrogen is continually added in chemically equivalent amounts with the feedstock additions to convert magnesium oxide to magnesium chloride.

When the electrolyte is substantially free of MgO, the electrolytic decomposition of $MgCl_2$ proceeds at a stable voltage typically in the range of four to seven volts dc. The precise voltage depends upon the composition and temperature of the cell. The voltage can vary smoothly as the $MgCl_2$ content of the electrolyte is depleted by electrolytic decomposition or increased by feedstock addition. However, the presence of MgO in the cell (even small amounts) causes erratic changes in the voltage display. The changes can be abrupt and relatively large compared to normal cell operation. Thus, when the cell operating voltage is seen to change erratically, hydrogen is bubbled into the electrolyte to co-react with chlorine in conversion of the magnesium oxide to $MgCl_2$. When the operating voltage shows normal voltage, hydrogen sparging is stopped.

Unipolar cells (like 10) have been operated at a typical voltage of 6 volts dc to produce Mg-Al alloys utilizing a feedstock of $MgCl_2$ containing about 2% by weight MgO. Hydrogen was continually bubbled into the electrolyte at the anode in an amount in chemical excess with respect to the MgO content of the feedstock. The typical operating current was about 5 to 50 amperes depending upon cell size at a current density of about 1 amp/cm$^2$. Magnesium-aluminum alloys were produced at a current efficiency of about 90 percent.

In the embodiment described above, the composition of the magnesium chloride-containing electrolyte was selected so that the electrolyte was lighter than the molten metal alloy cathode into which the magnesium metal was absorbed as it was produced. An advantage of this embodiment is that the relatively simple apparatus depicted in the FIGURE can be employed without a special anode chamber to separate the magnesium alloy from the chlorine gas evolved at the anode. However, the subject invention is equally applicable in those magnesium production embodiments in which a different electrolyte is employed that is heavier than that magnesium metal that is being produced, and the magnesium metal is produced on the upper surface of the electrolyte. In these embodiments which are typified by the Dow process, an anode compartment is provided that separates the chlorine gas produced at the anode from the magnesium metal produced at the cathode and floating on the upper surface of the electrolyte. In this latter embodiment, the hydrogen gas is sparged in the anode compartment in the vicinity of the anode itself so that the hydrogen and the chlorine react with any magnesium oxide present in or formed in the electrolyte. The addition of hydrogen in this way also may reduce the potential required for magnesium chloride decomposition.

Preparation of Anhydrous Magnesium Chloride

In the above embodiment, the reaction of chlorine and hydrogen or hydrocarbon with magnesium oxide in an operating magnesium production cell was illustrated. However, there is a second embodiment of the invention which may be practiced in connection with the preparation of anhydrous magnesium chloride for use in such production cells or in other applications.

In this embodiment, a melt of magnesium chloride (mp 714° C.) is prepared suitably at a temperature of about 725° C. to 800° C. Anhydrous magnesium chloride or partially dehydrated magnesium chloride may be used in the preparation of the melt. If partially dehydrated magnesium chloride is used, the water will either be driven off during the preparation of the melt or a portion of it will react with the magnesium chloride to form a magnesium oxide. When the melt has been established, additional quantities of partially dehydrated magnesium chloride and/or magnesium oxide are added to the melt. The magnesium oxide that is added or formed by reaction of water with magnesium chloride produces a dispersion of solid magnesium oxide material in the molten magnesium chloride. The amount of magnesium oxide that is employed or formed is suitably no greater than about 25% by weight of the total mixture. Preferably, no more than about 15% magnesium oxide is formed or used in the reactor.

Preferably, the reactor is a deep, narrow reactor similar in configuration to that depicted in the FIGURE for the magnesium production cell. However, this chemical reactor is provided with stirring capability suitable to thoroughly disperse the MgO solids in the molten $MgCl_2$ reaction medium. Hydrogen gas and chlorine gas are then bubbled simultaneously into the stirred mixture so as to obtain an intimate mixture of the three phases to promote the desired reaction between the gases and MgO particles converting them to $MgCl_2$, which dissolves in the melt and water. As stated above, a low molecular weight hydrocarbon gas such as natural gas, methane or ethane may be used with hydrogen or in place of hydrogen.

The hydrogen and chlorine react with the suspended magnesium oxide solid in the liquid magnesium chloride reaction medium to form magnesium chloride and water and $CO_2$ (if hydrocarbon is employed) which evolve from the reactor bath. At the completion of the reaction, molten anhydrous magnesium chloride has been prepared.

In the event that the mixing of the gases with the reaction medium is not suitable, there may be conditions in which the hydrogen and chlorine react with each other to form hydrogen chloride. This undesired reaction may be prevented by inserting an inert anode and cathode in spaced-apart relationship in the $MgCl_2$ reaction medium and passing a low voltage direct current potential across the bath at a level of about one volt or otherwise above the decomposition potential of hydrogen chloride.

In a practical situation, such a magnesium chloride reactor may be employed at a location adjacent a magnesium production cell. As the magnesium chloride constituent in the production cell is depleted by electrolysis, makeup magnesium chloride from the adjacent chemical reactor is siphoned or pumped into the production cell.

By such a reaction scheme and plant layout, magnesium oxide and/or partially dehydrated magnesium chloride may be added intermittently to the magnesium chloride reactor. The above-described reaction is caused to take place with the production of molten anhydrous magnesium chloride, which then in turn may be added into the magnesium production cell. Of course, the use of hydrogen and chlorine in the magnesium chloride reactor greatly reduces the mount of hydrogen that will need to be added to the magnesium production cell. Similarly, chlorine that is evolved in the magnesium production cell will, of course, be captured. A suitable use for such $Cl_2$ includes usage in the magnesium chloride reactor.

Utilization of Lithium Carbonate

As described above, lithium chloride is an optional suitable constituent of the electrolyte in the magnesium production cell. However, lithium carbonate is a less expensive, more readily obtained source of lithium. In the makeup of the electrolyte for the magnesium cell, lithium carbonate may be initially charged and dissolved in molten KCl and NaCl at a suitable temperature, for example, in the range of 700° C. to 800° C. Treatment of the molten solution of $Li_2CO_3$ in NaCl/KCl with $Cl_2$ forms LiCl in the salt mixture. Such solutions containing up to 30% to 40% $Li_2CO_3$ have been treated with chlorine to quantatively convert the lithium carbonate to lithium chloride. $MgCl_2$ may then be added to the KCl—LiCl—NaCl salt mixture to form the stamp electrolyte.

Similarly and alternatively, suitable quantities of lithium carbonate may be dissolved in molten lithium chloride and treated with chlorine gas to form lithium chloride. Such solutions containing up to 80% by weight lithium carbonate have been treated with chlorine to convert lithium carbonate to lithium chloride in substantially quantitive yield. Solution temperatures of 700° C. to 800° C. are suitable for the reaction.

Application of Hydrogen Reaction to Aluminum Production

It has not escaped notice that the reaction of hydrogen and chlorine with magnesium oxide in a magnesium chloride-containing medium has an analogy which is extremely useful in an electrolytic aluminum production cell. In an aluminum electrolyzing production cell, alumina ($Al_2O_3$) is dissolved in a molten cryolite based bath. In the operation of this Hall-Heroult type cell, aluminum is electrolytically deposited molten on a carbon cathode which also serves as the melt container. Simultaneously, oxygen from the alumina is produced on and consumes the cells carbon anodes. The Consumption of the cell's carbon anodes requires that an aluminum production operation involve a carbon anode manufacturing facility on site. Indeed, a substantial portion of the cost of producing aluminum resides in the manufacture of and consumption of the carbon electrodes. Analogous to the above-described practice in which hydrogen and/or a hydrocarbon gas is caused to react with magnesium oxide (along with chlorine in the case of magnesium) in a molten electrolyte and during the operation of the cell, it has been found that hydrogen may be bubbled into an aluminum production cell adjacent the carbon anodes. The benefit of employing such hydrogen/hydrocarbon gas is that such gas rather than the carbon anode reacts with the oxygen under the electrical potential applied to the cell. Water is evolved, and the consumption of the carbon anodes is greatly reduced or even eliminated. In this production operation, hydrogen/hydrocarbon in a chemical equivalent mount proportional to the oxygen to be evolved from the electrolyzed alumina is bubbled adjacent the anodes of the aluminum cell, the hydrogen reacts with the oxygen that is generated, and evolves as steam or water gas. Little, if any, consumption of the carbon anode is experienced.

While this invention has been described in terms of certain preferred embodiments thereof, it will be appreciated that other forms could readily be adapted by one skilled in the art. Accordingly, the scope of this invention is to be considered limited only by the following claims.

What is claimed is:

1. The method of converting magnesium oxide to magnesium chloride comprising:

separately and concurrently bubbling chlorine gas and hydrogen gas into a molten medium comprising magnesium chloride and a smaller amount of magnesium oxide to convert said magnesium oxide to magnesium chloride.

2. A method as recited in claim 1 in which the amount of magnesium oxide in said medium is no more than 25% by weight of the magnesium content of the medium.

3. A method as recited in claim 1 in which the magnesium oxide is immersed in a magnesium chloride-containing electrolyte of a magnesium production cell, said cell containing an anode at which chlorine gas is evolved during cell operation and hydrogen gas is bubbled into said electrolyte.

4. A method as recited in claim 1 in which magnesium oxide is stirred and dispersed in a molten reaction medium consisting essentially of magnesium chloride, and chlorine and hydrogen are bubbled into the molten medium in substantially equimolar amounts.

5. In the method of producing magnesium in which:

(1) a feedstock containing a major portion of magnesium chloride and optionally a minor portion of water as a hydrate and/or magnesium oxide is added to an electrolyte comprising magnesium chloride, salts of alkali metal and/or alkaline earth metal chlorides and impurity quantities of magnesium oxide;

(2) an electrical current is passed through the electrolyte under an electrical potential applied between an anode and a cathode;

(3) chlorine gas is evolved at the anode and magnesium metal at the cathode; the improvement comprising:

adding hydrogen into said electrolyte in the region of chlorine evolution during passage of said electrical potential to convert magnesium oxide to magnesium chloride.

6. A method as recited in claim 5 in which the quantity of hydrogen added is proportional to the quantity of magnesium oxide in the electrolyte.

7. A method as recited in claim 5 in which hydrogen is added to the electrolyte in response to erratic fluctuations in the applied electrical potential.

8. A method as recited in claim 5 in which (a) the electrolyte is more dense than the magnesium produced at the cathode, (b) the anode is isolated from the cathode and magnesium is produced there, and (c) the hydrogen is added adjacent said anode.

9. A method of converting magnesium oxide to anhydrous magnesium chloride comprising:

dispersing magnesium oxide solids in a stirred melt of magnesium chloride, separately bubbling chlorine and hydrogen gas into said stirred dispersion so as to promote the chemical reaction of chlorine and hydrogen with the dispersed solids to convert said magnesium oxide to anhydrous magnesium chloride, removing a portion of magnesium chloride from the melt when the dispersed magnesium oxide solids have been converted to magnesium oxide, and adding additional magnesium oxide to the melt.

10. A method as recited in claim 9 in which electrodes are inserted into the stirred dispersion and an electrical potential is applied to prevent evolution of hydrogen chloride from the melt.

11. In the electrolytic production of aluminum in which alumina is dissolved in a melt of cryolite electrolyte composition in an electrolytic cell and an anode of carbon composition is consumed by reaction with oxygen at said anode, the improvement comprising:

introducing hydrogen gas into the melt adjacent an anode to react with oxygen evolved there and to reduce the consumption of the anode by reaction with oxygen.

12. A method for producing lithium chloride from lithium carbonate comprising:

dissolving lithium carbonate in a molten salt consisting essentially of one or more salts selected from the group consisting of LiCl, KCl and NaCl, and bubbling chlorine gas in the mixture in sufficient quantity to convert said lithium carbonate to lithium chloride which dissolves in said molten salt.

13. A method as recited in claim 12 where the molten salt consists essentially of a mixture of potassium chloride and sodium chloride.

14. A method as recited in claim 12 in which the molten salt consists essentially of lithium chloride.

* * * * *